United States Patent [19]

Nakabayashi et al.

[11] Patent Number: 4,828,920

[45] Date of Patent: May 9, 1989

[54] HEAT ADHERABLE RESIN COMPOSITIONS AND ALUMINUM SHEET LAMINATED WITH THE COMPOSITIONS

[75] Inventors: Masamitsu Nakabayashi, Sennan; Yuzo Furukawa, Kawanishi; Teruo Hori, Toyonaka, all of Japan

[73] Assignee: Takeda Chemical Industries, Ltd., Osaka, Japan

[21] Appl. No.: 63,225

[22] Filed: Jun. 18, 1987

Related U.S. Application Data

[60] Division of Ser. No. 927,366, Nov. 6, 1986, abandoned, which is a continuation of Ser. No. 678,768, Dec. 5, 1984, abandoned.

[30] Foreign Application Priority Data

Dec. 12, 1983 [JP] Japan .................................. 58-234478
Sep. 18, 1984 [JP] Japan .................................. 59-195984

[51] Int. Cl.$^4$ .......................... B32B 15/08; C09J 7/02
[52] U.S. Cl. ..................................... 428/349; 428/457; 428/461; 428/500; 428/913
[58] Field of Search ............... 428/500, 349, 457, 461, 428/913; 525/59; 526/317

[56] References Cited

U.S. PATENT DOCUMENTS 3,520,861 7/1970 Thompson et al. ................. 428/500
3,911,053 10/1975 Wiest et al. ............................ 525/59
4,390,552 6/1983 Niwa .................................... 428/349

FOREIGN PATENT DOCUMENTS 1011981 10/1965 United Kingdom ................ 526/317

*Primary Examiner*—Thomas J. Herbert
*Attorney, Agent, or Firm*—Wenderoth, Lind & Ponack

[57] ABSTRACT

A heat adherable resin composition which comprises (a) a carboxyl-modified resin obtained by the reaction of a partially saponified product of an ethylene-vinyl acetate copolymer having a vinyl acetate content of 10 to 55 weight percent with an unsaturated carboxylic acid or dicarboxylic acid anhydride and (b) a monoolefin-unsaturated carboxylic acid copolymer or metal salt thereof is valuable as an adhesive layer for the heat sealable sheet made of aluminum foil which is used in the food industry in sealing and packaging the mouths of glass containers.

7 Claims, No Drawings

HEAT ADHERABLE RESIN COMPOSITIONS AND ALUMINUM SHEET LAMINATED WITH THE COMPOSITIONS

This is a Rule 60 Divisional Application of Ser. No. 927,366, filed Nov. 6, 1986, now abandoned which is a Continuation of Ser. No. 678,768, filed Dec. 5, 1984 now abandoned.

The present invention relates to a heat adherable resin composition and aluminum sheet for heat sealing laminated with said composition, and more particularly, to the compositions which are useful, for example, as an adhesive layer on the aluminum sheet for heat sealing of the mouths of glass containers for foods and so on.

In the food industry, recently, the so-called capless seal packaging technique which comprises filling a food product into glass containers and heat sealing their mouths with a special type of aluminum sheet has been arousing considerable attention as a replacement for the conventional technique which consists of sealing the food-filled glass containers with screw-thread caps. The aluminum sheet normally has a laminated structure in which an aluminum foil having a thickness in the range of $20\mu$ to $70\mu$ is provided on one surface thereof with a coating or lamination of a variety of adhesives directly or through a plastic layer such as a polyethylene film. It is required that such adhesives not only exhibit firm adhesivity toward the sheet material, for example, aluminum or films of polyethylene, etc., but also show moderate adhesivity toward glass. In other words, the composition needs adhesive strength sufficient to seal a glass container completely and the ability to be unsealed easily on the occasion of peeling off the seal, the so-called "easy peel" property. Even when a portion of the glass container to be sealed is stained slightly with the contents such as foods, it must have a sufficient strength of adhesion.

In addition to this, it is required for the composition to show the property that the container, not allowing the adhesive to remain on its mouth after removal of the sealed portion, keeps its mouth clean, so-called "clean peel" property.

Further, although the products filled with foods in the glass containers sometimes store for a long period of time, in the meantime, the adhesive strength must not be weakened. In particular, it is essentially reuired of such adhesives to retain adhesion or bonding performance over a prolonged period of time even under the conditions of being always kept in contact with water, as is the case with liquid foods such as juices and liquors and foods containing a high percentage of water such as jams and marmalades which glass containers hold therein.

In view of work efficiency of sealing, it is required of the aluminum sheet not to have the so-called "blocking" property in the adhesive layer.

Generally in the food industries, the filling of foods in glass containers and for sealing the glass containers has been carried out under a conveyer system.

The aluminum sheet is first punched out in a certain form, then through the collector, shooter, and so on , placed in the predetermined position of the mouth of a container. In the case that, however, the adhesion layer of the aluminum sheet has the "blocking" property, it is difficult to remove the punched sheets from the punch, and therefore, smooth transference of the sheets to the mouths of the containers is inhibited and, as a result, the work efficiency of filling foods in the containers is remarkably reduced.

It has heretofore been attempted to apply various kinds of the known hot-melt type adhesives to adhesion for heat sealing.

The present inventors have found that the resin composition prepared by melt-blending of the modified resin (hereinafter sometimes referred to briefly as "HEVA-C") obtained by introduction of carboxyl groups into the saponification product formed by saponifying ethylene-vinyl acetate copolymer and ethylene-acrylic acid copolymer, ethylene methacrylic acid copolymer or metal salts thereof, have a number of excellent properties required for an adhesive of the aluminum sheet for heat sealing, and that it is especially useful as an adhesive for heat sealing.

Heretofore, as the heat sealable adhesive, thus far known are, for example, metal salts of monoolefin-unsaturated carboxylic acid copolymer or the mixture of the said metal salts and monoolefin-unsaturated carboxylic acid copolymer. These adhesives remain a problem for solution in view of their poor water resistance. Therefore, it has been difficult for containers filled with foods containing water to use these additives as the sealing material.

In addition to this, films of such copolymer resins have "blocking" property by nature and, therefore, the use of various kinds of additives has been inevitable.

The modified resin obtained by introduction of carboxyl groups into the saponified product prepared by saponification of ethylene-vinyl acetate copolymer has been proposed. However, the aluminum sheet laminated with the said resin alone, has a defect in that work efficiency in filling contents into the containers and in sealing the container with the sheet has not improved.

Such resin when put into use can provide improved water resistance, but fails to demonstrate satisfactory bonding strength toward glass in the heat-sealing of the mouths of bottles with such sheet, unless heated up to temperatures as high as, normally not lower than 200° C., and in practice, 250° to 270° C., is applied. Heat sealing at such high temperatures, not only causes pieces of food adhering in the neighborhood of the mouth of the bottle to change in quality, but also raises the problem, for example, the deterioration and decomposition of cushioning materials such as heat-resistant rubber, which are, as a rule, employed in combination in the heat source of heat sealing equipment for the prevention of breakage or damage of bottle mouths. Consequently, it has been strongly demanded in the food industry to develop a heat adherable resin composition which can permit heat seals to be made at temperatures as low as not more than 200° C., preferably 150° to 180° C., and also demonstrate excellent bonding strength and water resistance performance, even when heat sealed under such mild conditions. However, such composition has not yet been proposed.

An object of this invention is to provide heat adherable resin compositions which possess low-temperature heat-sealable properties, "easy peel" properties, "clean peel" properties and also excellent water resistance.

Another object of this invention is to provide heat adherable resin compositions having extremely low blocking properties when laminated on an aluminum sheet.

Thus, the present invention is directed to (1) heat adherable resin compositions which contain (a) a carboxyl-modified resin obtained by the reaction of a partially saponified product of an ethylene-vinyl acetate copolymer having a vinyl acetate content of 10 to 55 weight percent with an unsaturated carboxylic acid or dicarboxylic acid anhydride and (b) monoolefin-unsaturated carboxylic acid copolymer or metal salts thereof, and (2) an aluminum sheet for heat sealing laminated with the heat adherable resin composition which contains (a) carboxyl-modified resin obtained by the reaction of a partially saponified product of an ethylene-vinyl acetate copolymer having a vinyl acetate content of 10 to 55 weight percent with an unsaturatd carboxylic acid or dicarboxylic acid anhydride and (b) a monoolefin-unsaturated carboxylic acid copolymer or metal salts thereof.

The resin component (a) which is used in the present invention is to be described in the following. As the ethylenevinyl acetate copolymer (hereinafter referred to briefly as "EVA") usable as a raw material in the production of the resin component, reference is made to copolymers having a vinyl acetate content of 10 to 55 weight percent, preferably 25 to 45 weight percent. EVA having such a vinyl acetate content as mentioned above is produced by known processes such as the high-pressure process, and use can be normally made of those having a melt index (g/10 min.; as determined in accordance with ASTM D 1238-65T; the same shall apply hereinafter) of 0.1 to 500, preferably 1 to 300. The EVA raw material is then subjected to a saponification reaction to produce a partially saponified product (hereinafter referred to briefly as "HEVA") of EVA. The degree of saponification is normally 10% to 98%, preferably 30 to 98%, more preferably 40 to 98%. The saponification reaction may be carried out by the conventionally known methods, and can be for example conducted in a system consisting of an alcohol having a low boiling point such as methanol and ethanol and an alkali such as sodium hydroxide, potassium hydroxide and sodium methylate. Subsequently, the carboxyl-modified resin (a) can be produced with use of such HEVA. The method of introucing carboxyl groups into HEVA includes the methods utilizing a graft reaction and an esterification reaction, respectively. In order to utilize a graft reaction, an unsaturated carboxylic acid is employed. As such unsaturated carboxylic acid, by way of example, there may be mentioned unsaturated monocarboxylic acids such as acrylic acid, methacrylic acid, crotonic acid and itaconic acid, and unsaturated dicarboxylic acids (or their anhydrides) such as maleic acid, and normally, use is made of acrylic acid. The graft reaction may be carried out under the ordinary reaction conditions using a radical initiator such as benzoyl peroxide, lauroyl peroxide and α,α'-azobisisobutyronitrile. The unsaturated carboxylic acid is used in the proportion of 0.1 to 15 weight percent against the weight of HEVA, preferably 0.5 to 5 weight percent. The carboxyl-modified resin as obtained by such reaction shows an acid value of, normally 0.5 to 120, preferably 3 to 50. In cases in which an esterification reaction is utilized, a dicarboxylic acid anhydride is subjected to the reaction under the ordinarily employed esterification conditions. As such dicarboxylic acid anhydride, by way of example, there may be mentioned maleic anhydride, succinic anhydride, phthalic anhydride, hexahydrophthalic anhydride, etc. The amount of the dicarboxylic acid anhydride to be used is in such an amount as may be required to esterify 5 to 60 mole percent, preferably 10 to 50 mole percent, of the hydroxyl groups in HEVA. The carboxyl-modified resin as obtained by the said esterification raction exhibits an acid value of, normally 10 to 200, preferably 20 to 150.

Then, the resin component (b) which is useful in the present invention is to be described below.

The monoolefin-unsaturated carboxylic acid copolymer [hereinafter sometimes referred to briefly as "Resin Component (b−1)"] is basically a resin formed by the copolymerization of a monoolefin such as ethylene, propylene, butene-1, isobutene, 4-methylpentene-1, hexene-1 and heptene-1 with an α,β-unsaturated carboxylic acid such as acrylic acid, methacrylic acid and crotonic acid, and ethylene-acrylic acid copolymer resins or ethylene-methacrylic acid copolymer resins are normally employed. Such copolymer resin component shows a molecular weight of 1,000 to 200,000, with the unsaturated carboxylic acid content in said copolymer being 1 to 30 weight percent, preferably 2 to 20 weight percent. Such resin component and its production process are known, and in the present invention, ethylene-acrylic acid copolymer resin such as commercially available products (sold by Dow Chemical Japan Inc. under the trade names EAA 435, EAA 452, EAA 455, EAA 459, EAA X0-2375.33) can be utilized as such.

As the metal salts of the monoolefin-unsaturated carboxylic acid copolymer resin, there may be mentioned an ion cross-linked resin, i.e., the so-called ionomer resin [hereinafter sometimes referred to briefly as "Resin Component (b−2)"] which is produced by neutralizing carboxyl groups included in the above-mentioned copolymer resin, especially ethylene-methacrylic acid copolymer resin with ions of alkali metals such as sodium ion or ions of such metals belonging to the Group II in the Periodic Table such as zinc and magnesium. In this invention, the Zn type isonomer resin is favorably employed.

The Resin component (b−2) itself and the production thereof are known by, for example, British Patent No. 1,011,981. According to the present invention, commercially available products (e.g., ionomer resins produced by Mitsui Du-pont Polychemical Co. under the trade names HIMILAN® 1554, 1555, 1557, 1601, 1605, 1650, 1652, 1702, 1706, 1707, 1855, 1856) can be utilized as such. These resins (e.g., methacryl acid, acryl acid), have 5 to 18% of acid content and several percent to 90 percent of ionization degree. The mixture of said resin component (b−1) and its metal salt component (b−2) is also usable.

The heat adherable resin composition of the present invention can be manufactured by melt blending the above-mentioned resin components (a) and (b). With reference to the blending ratio of the two components, the resin component (a) is 30 to 97 weight percent, whereas the resin component (b) is 70 to 3 weight percent (both components make a total of 100 weight percent; the same shall apply hereinafter). Taking into consideration the characteristic features of the composition of the present invention, the low-temperature heat sealable property, water resistance, "easy peel" property, anti-blocking property and so on, the ratio of 30 to 90 weight percent of the component (a) and 70 to 10 weight percent of the component (b) is preferable, especially 50 to 90 weight percent of the component (a) and 50 to 10 weight percent of the component (b) is more preferable. In case that the ratio of the resin component (a) exceeds the range mentioned above, the blocking property is remarkably seen in the adhesive layers on the sheets and in the case where the ratio of the resin component (a) is lower than such range, the physical properties of the composition such as water resistance and "clean peel" property become worse.

The melt-mixing of the two components (a) and (b) is carried out, for example, by use of a single-screw extruder, twin-screw extruder, Bambury mixer and kneader, normally under the temperature conditions of about 120° to 180° C. The heat adherable resin composition that has been uniformly melt-mixed by the above procedure exhibits normally a melt index of 1 to 150 and excels in melt fluidity. This composition can be processed into various forms such as powder, pellet, fiber, sheet and film, depending upon the application, but because of its particularly good melt fluidity or flow property, can be easily converted into films, for example, by the inflation molding process and cast forming process.

Various kinds of additives are normally employed, such as antioxidants, light stabilizers, heat stabilizers, colorants, lubricants, plasticizers and processability improving agents. These may be suitably added to the composition of the present invention to such an extent as may not impair its effects of low-temperature heat sealable property and water resistance. The formulation ratios of these additives and fillers are not particularly limited, but, preferably, are normally not more than about 10 weight percent against the resin composition.

In order to conduct the bonding of aluminum foil with use of the composition of the present invention, the method of heat bonding at 150° to 250° C., preferably at 160° to 220° C. is adopted. In generaly, the bonding pressure is contact pressure to about 10 kg/cm$^2$, while the bonding time is 1 second to 30 minutes, and these conditions may be suitably set depending upon the object. The heat adherable composition of the present invention is valuable as an adhesive layer for the heat sealable sheet made of aluminum foil which is used in the food industry in sealing and packaging the mouths of glass containers.

The aluminum sheet for heat sealing, formed with use of the composition prepared by melt blending of Resin component (a) and Resin component (b−2), shows extremely low blocking properties compared to other heat adherable resin compositions, and therefore, has the advantage that the additives of anti-blocking agent to the composition is not necessary at all.

Normally, drinks containing fruit juice are sterilized under high temperatures of about 90° to 100 ° C. Thus treated drinks are usually charged into containers without cooling. The aluminum sheet according to the present invention is suitably applied also to the mouth of a container containing heated foods without any trouble.

The following is the description of the present heat adherable resin composition when it is used as heat sealable sheets.

As the heat sealable aluminum sheet usable for glass containers, etc., there are in general available a sheet consisting of an aluminum foil having a thickness in the range of 20 to 70μ being provided directly on its one surface with a heat adherable resin layer having a thickness in the range of 20 to 70μ, or a laminated sheet having a thermoplastic film layer of a thickness in the range of 15 to 30μ made, for example, from polyethylene, polypropylene, polyethylene terephthalate, etc. provided in advance between the aluminum foil and adherable resin layer so as to prevent corrosion of the aluminum foil by the contents or allow the film to serve as a cushioning material on the occasion of heat sealing, and the composition of the present invention can be used as a heat adherable resin layer for such sheet. For example, a sheet material consisting of an aluminum foil and an adhesive layer can be manufactured by the extrusion lamination of the adherable composition of the present invention on the aluminum foil or by the dry lamination of the composition of the present invention in the film on the aluminum foil with the use of an isocyanate based adhesive. Also, a laminated sheet material having an aluminum foil and an adhesive layer through a film layer can be produced by first applying an isocyanate based anchor coating agent on the aluminum foil and then forming a polyethylene layer thereon for example through extrusion lamination, followed by the extrusion lamination of the heat adherable resin composition of the present invention on said polyethylene layer. Such sheet material can also be manufactured by bonding a polyethylene film to an aluminum foil by use of an isocyanate based adhesive, followed by the dry lamination of the adherable resin composition of the present invention in the film form thereon by use of the same adhesive.

In sealing the mouths of glass containers by use of the heat sealable sheet produced in this manner, customarily employed heating means such as the induction seal method using high frequency and the method utilizing heated plates can be employed. The heating temperature is 150° to 250° C., whereby heat sealing may be normally conducted under pressure of 0.1 to 10 kg/cm$^2$ for 1 to 5 seconds, and the preferred heat sealing conditions, which vary depending upon the type of composition used, are 160° C.–220° C., 2–6 kg/cm$^2$ and 1–2 seconds.

The glass container being heat-sealed by the above procedure, even when it holds a liquid food container water, is completely free from a decline in bonding strength during storage for a prolonged period of time, and is exceptionally excellent in terms of hermetic sealing property. In addition, such heat-sealed glass container when placed in service can demonstrate the "easy peel" property in peeling off the sealed portion, and offer the advantage that the container does not have adhesive remaining on its mouth after removal of the sealed portion, i.e., retains a clean mouth ("clean peel" property).

The aluminum sheet formed with the use of the resin composition shows a low blocking property, and therefore, efficiency in packing of foods and sealing of containers can be improved remarkably.

In addition to this, aluminum sheet produced by the use of the resin composition of this invention shows an excellent heat sealability even when the food strains around the mouth of the container, and a rate of occurrence of incompletely sealed products is very low.

The examples are described in the following to illustrate the present invention more concretely.

EXAMPLE 1

HEVA-C (with a melt index of 15) produced by grafting of 1.0 weight percent of acrylic acid to a saponified product (with a saponification ratio of 70%) prepared by saponifying an ethylene-vinyl acetate copolymer (EVAFLEX ® 150; produced by Mitsui Polychemical Co.; with a vinyl acetate content of 33 weight percent and a melt index of 30) and an ethylene-acrylic acid copolymer (EAA X0-2375.33; produced by Dow Chemical Japan Inc.; with an acrylic acid content of 20 weight percent and a melt index of 300) were formulated in the different proportions as shown in Table I, and melt-mixed at 130° C. using a single screw extruder of 30 mmφ to prepare nine kinds of heat adherable resin compositions.

The following experiment was carried out with the individual compositions.

Thus, the composition was placed on a 50 μthick aluminum foil, which was then press-formed at 150° C. with use of a press machine to provide a 100-μthick adherable resin layer on the aluminum foil. The resulting aluminum sheet having a resin layer was placed on a flat float glass plate (measuring 30×100×3 mm) in such a manner as the resin layer of the aluminum sheet may come in contact with the glass plate, and the assembly was heat sealed at 160° C. under pressure of 1 kg/cm² for 1 second with use of a heat sealing equipment to prepare an adhesion test specimen.

A 180° peel-off bonding strength test (JIS K-6854) was carried out with the test specimen. Also, the same test specimen was immersed in water for six months, and examined for a change in bonding strength in relation to time elapsed. The results are shown in the following table.

TABLE I

| Heat adherable resin composition | | 180° peel-off bonding strength (g/10 mm) | |
|---|---|---|---|
| HEVA-C (weight part) | Ethylene-acrylic acid copolymer (weight part) | Immediately after heat sealing | 6 months after heat sealing |
| *0 | 100 | 400 | not more than 50 |
| *20 | 80 | 1,200 | 100 |
| 30 | 70 | 1,350 | 1,200 |
| 50 | 50 | 1,800 | 1,700 |
| 70 | 30 | 1,900 | 1,950 |
| 90 | 10 | 1,900 | 1,850 |
| 95 | 5 | 1,600 | 1,500 |
| 97 | 3 | 1,300 | 1,200 |
| *100 | 0 | 990 | 300 |

Above compositions preceeded by an astrisk (*) are comparative examples.

EXAMPLE 2

A 70 parts by weight quantity of HEVA-C (with a melt index of 8.5) produced by grafting of 3.0 weight percent of acrylic acid to a saponified product (with a saponification rate of 50%) prepared by saponifying an ethylene-vinyl acetate copolymer (EVAFLEX $^R$ 150, produced by Mitsui Polychemical Co.; with a vinyl acetate content of 33 weight percent and a melt index of 30) and 30 parts by weight of an ethylene-acrylic acid copolymer (EAA XO-2375.33, produced by Dow Chemical Japan Inc.; with an acrylic acid content of 20 weight percent and a melt index of 300) were melt-blended at 130° C. using a single-screw extruder of 300 mmφ to yield a heat adherable resin composition with a melt index of 27.

With use of the resin composition, extrusion lamination was conducted on a laminated sheet of aluminum foil (with a thickness of 50μ) and polyethylene film (with a thickness of 15μ), which was bonded with an isocyanate based adhesive so that a 50 μthick resin layer could be formed on the polyethylene film side of the laminated sheet, thereby fabricating a heat sealable sheet.

The sheet was set on the mouth of a glass container (with an inner capacity of 300 cc and a mouth diameter of 77 mm; untreated and filled with water), and heated and bonded under pressure under the conditions of 100° C.×2.0 kg/cm² for 1 second with use of a heat sealing equipment to seal the mouth of the container.

The heat sealed container showed a heat sealing strength (180° peel-off bonding strength) of 2600 g/15 mm (the mean of measurements taken at four points). With the same sealed bottle, the pressure resistance strength was measured, with the result that it showed 1.1 kg/cm². When the sealed portion was torn off, it was easily peeled off with none of the resin component observed to adhere on the glass surface of the container mouth.

In the same manner as described above, the sealed container, after being filled with water, was fabricated and was allowed to stand at room temperature for six months while being turned upside-down. The sealed portion of the container exhibited a bonding strength of 2500 g/15 mm.

EXAMPLE 3

An 80 parts by weight quantity of HEVA-C (with a melt index of 10) produced by graft reaction of 2.5 weight percent of acrylic acid with a saponified product (with a saponification ratio of 40%) preapred by saponifying an ethylene vinyl acetate copolymer (EVA-FLEX ® 40, produced by Mitsui Polychemical Co.; with a vinyl acetate content of 40 weight percent and a melt index of 55) and 20 parts by weight of an ethylene-acrylic acid copolymer (EAA 459, produced by Dow Chemical Japan Inc.; with an acrylic acid content of 8 weight percent and a melt index of 9) were melt-blended at 140° C. to produce a uniform heat adherable resin composition.

The composition was press-formed at 150° C. to prepare a 100 μthick, adherable sheet. The sheet was held between two aluminum plates (measuring 200×200×0.2 mm), and this assembly was heated and bonded under pressure under the conditions of 150° C.×100 kg/cm² for 10 minutes with use of a press machine to give a bonding test specimen. With this test specimen, a 180° peel-off bonding strength test was carried out, with the result that it showed 14 kg/25 mm. The same test specimen was immersed in water for six months, and measurement of the bonding strength showed the value of 12.8 kg/25 mm.

EXAMPLE 4

A 60 parts by weight quantity of HEVA-C (with an esterification ratio of 25% and a melt index of 65) produced by the esterification reaction of hexahydrophthalic anhydride with an esterified product (with an esterification ratio of 90%) prepared by saponifying an ethylene-vinyl acetate copolymer (EVAFLEX ® 220, produced by Mitsui Polychemical Co.; with a vinyl acetate content of 28 weight percent and a melt index of 150) and 40 parts by weight of an ethylene-acrylic acid copolymer (EAA 435, produced by Dow Chemical Japan Inc.; with an acrylic acid content of 3.5 weight percent and a melt index of 11.0) were melt-blended at 130° C. to produce a uniform heat adherable resin composition.

In the same manner as

EXAMPLE 2, a heat sealable sheet material was produced with use of the composition.

Using the sheet material and in the same manner as

EXAMPLE 2, the mouth of a glass container was sealed. The sealed glass container showed a 180° peel-off bonding strength of 2000 g/15 mm. After peeling-off, no resin compoistion was observed to adhere on the glass surface of the container mouth.

EXAMPLE 5

A 75 parts by weight quantity of HEVA-C (with a melt index of 15) produced by graft reaction of 1.0 weight percent of acrylic acid to a saponified product (with a saponification ratio of 70%) formed by saponifying an ethylene-vinyl acetate copolymer (EVAFLEX® 150; produced by Mitsui Polychemical Co. with a vinyl acetate content of 33 weight percent and a melt index of 30) and 25 parts by weight of zinc ion type-ionomer resin (zinc salt of ethylene-methacrylic acid copolymer; HIMILAN® 1705, produced by Mitsui Du-pont Polychemical Co.; with a melt index of 14) were melt-bonded at 130° C. using a single-screw extruder of 30 mm$\phi$ to yield a heat adherable resin composition.

The composition thus obtained was placed on a 50 $\mu$thick aluminum foil, which was then press-formed at 150° C. with use of a press maching to provide a 100 $\mu$thick adherable resin layer on the aluminum foil. The resulting aluminum foil having a resin layer was placed on a flat float glass plate (measuring $30 \times 100 \times 3$ mm) in such a manner as the resin layer of the aluminum foil may come in contact with the glass plate, and the assembly was heat sealed at 180° C. under pressure of 1.1 kg/cm$^2$ for 2 seconds with use of a heat sealing equipment to prepare an adhesion test specimen. The surface of adhesive layer of the sheet did not show any blocking property.

A 180° peel-off bonding strength test (JIS K-6854) was carried out with the test specimen, with the result that it showed the adhesive strength of 2000 g/10 mm. After the peeling-off test, the surface of the glass was clean and no resin composition was observed to adhere on the glass surface. Also, the same test specimen was immersed in water for six months, and examined for a change in bonding strength in relation to time elapsed, with the result that it showed the adhesive strength of 1950 g/10 mm.

EXAMPLE 6

A 75 parts by weight quantity of HEVA-C (with a melt index of 8.5) produced by graft reaction of 3.0 weight percent of acrylic acid to a saponified product (with a saponification ration of 50%) prepared by saponifying an ethylene-vinyl acetate copolymer (EVAFLEX® 150, produced by Mitsui Polychemical Co.; with a vinyl acetate content of 33 weight percent and a melt index of 30) and 25 parts by weight of zinc ion type-ionomer resin (zinc salt of ethylene-methacrylic acid copolymer; HIMILAN® 1702, produced by Mitsui Du-pont Polychemical Co., with a melt index of 14) were melt-blended at 130° C. using a single-screw extruder of 30 mm$\phi$ to yield a heat adherable resin composition with a melt index of 27.

With use of the resin composition, extrusion lamination was conducted on a laminated sheet of aluminum foil with a thickness of 50$\mu$ and polyethylene film with a thickness of 15$\mu$, which was bonded with an isocyanate based adhesive so that 50 $\mu$thick resin layer would be formed on the polyethylene film side of the laminated sheet, thereby fabricating a heat sealable sheet material.

Specific shaped sealings adaptable to a mouth of a glass container were punched from the sheet material with a press punching machine.

In the press punching process, the blocking property was not observed in the adhesive layer of the sheet and the process was carried out smoothly.

The sheet material was set on the mouth of a glass container (with an inner capacity of 300 cc and a mouth diameter of 77 mm; untreated and filled with water), and heated and bonded under pressure under the conditions of 180° C.$\times$160 kg per container for 2 seconds with use of heat sealing equipment to seal the mouth of the container.

The heat sealed container showed a heat sealing strength (180° peel-off bonding strength) of 2500 g/15 mm (the mean of measurements taken at four points). With the same sealed bottle, the pressure resistance strength was measured, with the result that it showed 0.9 kg/cm$^2$. When the sealed portion was torn off, it was easily peeled off and no resin composition was observed to adhere on the glass surface of the mouth of the container.

In the same manner as described above, the sealed container after being filled with water was fabricated, and was allowed to stand at room temperature for six months while being turned upside-down. The sealed portion of the container exhibited a bonding strength of 2400 g/15 mm.

EXAMPLE 7

An 80 parts by weight of HEVA-C (with a melt index of 10) produced by the graft reaction of 2.5 weight percent of acrylic acid with a saponified product (with a saponification ratio of 40%) prepared by saponifying an ethylene-vinyl acetate copolymer (EVAFLEX® 40, produced by Mitsui Polychemical Co.; with a vinyl acetate content of 40 weight percent, and a melt index of 55) and 20 parts by weight of zinc ion type ionomer resin (zinc salt of ethylene-methacrylic acid copolymer; HIMILAN® 1652; produced by Mitsui Du-pont Chemical Co., with a melt index of 5) were melt-blended at 150° C. to produce a uniform heat adherable resin composition.

The composition was press-formed at 150° C. to give a 100$\mu$thick, adherable sheet. The sheet was held between two aluminum plates (measuring $200 \times 200 \times 0.2$ mm), and this assembly was heated and bonded under pressure under the conditions of 150° C.$\times$100 kg/cm$^2$ for ten minutes with use of a press machine to give a bonding test specimen. With this test specimen, a 180° peel-off bonding strength test was carried out, with the result of 12 kg/25 mm. The same test specimen was immersed in water for six months, and measurement of the bonding strength revealed the value of 11.5 kg/25 mm.

EXAMPLE 8

80 parts by weight of HEVA-C (with an esterification ratio of 25% and a melt index of 65) produced by esterification of hexahydrophthalic anhydride with a saponified product (with a saponification ratio of 90%) prepared by saponifying an ethylene-vinyl acetate copolymer (EVAFLEX® 220, produced by Mitsui Polychemical Co.; with a vinyl acetate content of 28 weight percent and a melt index of 150) and 20 parts of sodium ion type ionomer resin (sodium salt of ethylene-methacrylic acid copolymer; HIMILAN® 1707, produced by Mitsui Du-pont Polychemical Co., with a melt index of 0.9) were melt-blended at 140° C. to produce a uniform heat adherable resin composition.

In the same manner as Example 6, a heat sealable sheet was produced with use of the composition. No blocking property was observed in the resin layer of the sheet.

In the same manner as

EXAMPLE 6, a mouth of the glass container showed a 180° peel-off bonding strength of 2050 g/15 mm. After a peeling-off test, no resin component was observed to adhere on the glass surface of the mouth of the container.

EXAMPLE 9

70 parts by weight of the modified resin having carboxyl groups (HEVA-C) employed in EXAMPLE 1, 15 parts by weight of ehtylene-acrylic acid copolymer (EAA XO-2375.33) and 15 parts by weight of zinc ion type ionomer resin (HIMILAN® 1702) were melt-blended at 140° C. to produce a uniform heat adherable resin composition.

With the use of the composition, a heat sealable sheet was produced in a manner similar to that of

EXAMPLE 6.

With use of the sheet and in the same manner as

EXAMPLE 6, the mouth of a glass container was sealed. The sealed glass container showed a 180° peel-off bonding strength of 2000 g/15 mm. After unsealing, no adhesive was observed on the mouth of the glass container.

What is claimed is:

1. Aluminum sheet for heat sealing by laminating aluminum foil with a heat adherable resin composition which comprises (a) a carboxyl-modified resin obtained by the reaction of a partially saponified product of an ethylene-vinyl acetate copolymer having a vinyl acetate content of 10 to 55 weight percent with acrylic acid, the acrylic acid being used in the proportion of 0.5 to 5 weight percent based on the weight of the partially saponified product and the dicarboxylic acid anhydride being used in such an amount as may be required to esterify 5 to 60 mole percent of the hydroxyl groups in the partially saponified product and (b) a monoolefin-unsaturated carboxylic acid copolymer or metal salts thereof, and wherein the ratio of the components (a) and (b) is 30 to 97 weight percent of the component (a) and 70 to 3 weight percent of the component (b).

2. The aluminum sheet according to claim 1, wherein the ratio of components (a) and (b) is 30 to 90 weight percent of component (a) and 70 to 10 weight percent of component (b).

3. The aluminum sheet according to claim 1, wherein the ratio of components (a) and (b) is 50 to 90 weight percent of component (a) and 50 to 10 weight percent of component (b).

4. The aluminum sheet according to claim 1, wherein the vinyl acetate content in the ethylene-vinyl acetate copolymer is 25 to 45 weight percent.

5. The aluminum sheet according to claim 1, wherein the saponification degree of the partially saponified product of the ethylene-vinyl acetate copolymer is 10 to 98%.

6. The aluminum sheet according to claim 1, wherein the component (b) is an ethylene-acrylic acid copolymer.

7. The aluminum sheet according to claim 1, wherein the component (b) is a zinc salt of an ethylene-methacrylic acid.

* * * * *